United States Patent [19]

Havens

[11] Patent Number: 4,698,111

[45] Date of Patent: Oct. 6, 1987

[54] VINYLIDENE CHLORIDE COMPOSITION AND FILM MADE THEREFROM

[75] Inventor: Marvin R. Havens, Greer, S.C.

[73] Assignee: W. R. Grace & Co., Cryovac Div., Duncan, S.C.

[21] Appl. No.: 944,481

[22] Filed: Dec. 19, 1986

Related U.S. Application Data

[62] Division of Ser. No. 755,033, Jul. 15, 1985.

[51] Int. Cl.$^4$ .............................................. B32B 27/08
[52] U.S. Cl. ........................... 156/244.11; 156/244.17
[58] Field of Search ................................ 428/520, 522; 156/244.11, 244.17

[56] References Cited

U.S. PATENT DOCUMENTS

| | | | |
|---|---|---|---|
| 2,919,059 | 12/1959 | Sporka | 229/3.5 |
| 3,741,253 | 3/1973 | Brax et al. | 428/35 |
| 4,112,181 | 9/1978 | Baird, Jr. et al. | 428/508 |
| 4,115,334 | 9/1978 | Gerow | 428/500 |
| 4,161,562 | 7/1979 | Yoshikawa et al. | 428/21 J |
| 4,274,999 | 3/1979 | Burley et al. | 428/516 |

FOREIGN PATENT DOCUMENTS

| | | | |
|---|---|---|---|
| 968689 | 6/1975 | Canada . | |
| 7011346 | 3/1977 | Japan | 428/522 |
| 223832 | 11/1985 | Japan | 428/522 |
| 2145447 | 3/1985 | United Kingdom | 428/522 |

*Primary Examiner*—Edith Buffalow
*Attorney, Agent, or Firm*—John J. Toney; William D. Lee, Jr.; Mark B. Quatt

[57] ABSTRACT

This invention relates to films made from vinylidene chloride polymers or copolymers. Specifically, this invention relates to a method and composition for lowering the oxygen permeability and enhancing the thermal stability of mono-layer and multi-layer packaging films having a plasticized layer of vinylidene chloride copolymer film.

7 Claims, No Drawings

VINYLIDENE CHLORIDE COMPOSITION AND FILM MADE THEREFROM

This is a divisional application of application Ser. No. 755,033, filed on July 15, 1985.

BACKGROUND OF THE INVENTION

Thermoplastic packaging films made of vinylidene chloride copolymer, hereinafter referred to generally as "saran", have been used for a long number of years to package food products which include cheese, fresh and processed meats, and a wide variety of other food and non-food items. Examples of such films are disclosed in U.S. Pat. No. 2,919,059 which issued in December 1959 to Arthur F. Sporka. This patent discloses laminate films of cellophane-saran-polyethylene and polyethylene-saran-polyethylene which are made by treating the polyethylene film surface to enhance its cling sheer strength so that a laminate or multi-layer film can be made by using the inherent attractive forces in the face-to-face surfaces of adjoining plies of pre-formed film.

A later and more satisfactory method of producing a multi-layer film having a layer of saran is disclosed in U.S. Pat. No. 4,112,181 which issued on Sept. 5, 1978 to William G. Baird, Jr. et al. In this patent a method of coextruding a tubular film is described wherein the walls of the tube have at least three layers, a center layer being a saran layer. The tubular film is subsequently biaxially oriented by the trapped bubble technique.

Another satisfactory method of producing a multi-layer saran film is disclosed in U.S. Pat. No. 3,741,253 which issued on June 26, 1973 to Harri J. Brax et al, which specifically discloses a multi-layer, biaxially oriented film having a saran barrier layer. This film is made by an extrusion coating process in which a substrate of polyethylene or ethylene vinyl acetate copolymer is coextruded in the form of a tube, cross-linked by irradiation, inflated into a tubing, a layer of saran extrusion coated onto the inflated tubing, and then another layer of ethylene-vinyl acetate copolymer is coated onto the saran. After cooling, this multi-layer tubular structure is flattened and rolled up. At a later time, the tube is inflated, sent through a hot water bath where it is heated to its orientation temperature, and as it is drawn out of the bath, it is inflated into a bubble thereby biaxially orienting the film. The bubble is rapidly cooled to set the orientation. This process produces a shrinkable barrier film with low oxygen permeability. Also, the advantages of a cross-linked film are provided without subjecting the saran layer to irradiation which tends to degrade saran.

The barrier layer in the above mentioned patent to Brax et al is a plasticized copolymer of vinylidene chloride and vinyl chloride. The copolymer is a mixture of 10% suspension polymerized and 90% emulsion polymerized copolymer. The emulsion polymerized copolymer comprises about 70% vinylidene chloride and 30% vinyl chloride and the suspension polymerized copolymer comprises about 80% vinylidene chloride and 20% vinyl chloride. Such copolymers are obtainable from the Dow Chemical Company of Midland, Mich.

In order to be successfully extruded at commercial rates the foregoing described mixture of vinylidene chloride copolymers must be stabilized and plasticized. A successful stabilizer-plasticizer combination is epichlorohydrin/bisphenol, an epoxy resin sold as EPON resin 828 by the Shell Chemical Company, and 2-ethyl hexyl diphenyl phosphate sold as Santicizer-141 by Monsanto Chemical Co. Other known stabilizers include epoxidized linseed oil and epoxidized soybean oil and citrates. A quite successful and satisfactory plasticizer package is made using approximately 4% of the Epon 828 and approximately 2% of the Santicizer-141 in the foregoing described mixture of vinylidene chloride copolymers.

In Canadian Pat. No. 968,689, which was issued on June 5, 1975 to Mario Gillio-Tos et al, the effect of plasticizers on the barrier properties of a saran barrier layer in a multi-layer thermoplastic packaging film is described. First, the Gillio-Tos et al patent discloses that homopolymers of vinylidene chloride cannot be converted into film by conventional extrusion techniques because they decompose very rapidly at the temperature of extrusion. Second, by copolymerizing vinylidene chloride with minor amounts of one or more other monomers such as vinyl chloride, methyl acrylate, etc. it is possible to produce copolymers which, when mixed with suitable plasticizers, can be extruded into films which can be oriented by stretching to give shrinkable film. The oriented films are heat shrinkable and are widely used for packaging purposes, particularly for packaging food. As stated, vinylidene chloride copolymers need to be plasticized so that they can be satisfactorily extruded and stretched into oriented films. The greater the proportion of plasticizer the easier the polymer is to extrude and orient and the better the abuse resistance of the final product. On the other hand, the oxygen permeability of the final product also increases with increasing plasticizer content and for many purposes, especially packaging food, it is vital that the oxygen permeability should be low. In recent years, the requirements of the packaging industry have become more and more demanding and for current commercial practices permeability below 100 cc/24 hours/m$^2$/atmosphere is expected and a permeability below 50 is highly desirable.

Accordingly, it is an object of the present invention to provide a vinylidene chloride copolymer composition which can be extruded with reduced plasticizer content and, hence, lowered and improved oxygen permeability.

By lowering the oxygen and gas permeability the thickness of barrier layers and, hence, the quantity of saran required for a barrier film is reduced. Also since the thickness of saran layers can be reduced, it is another object of the present invention to provide a film wherein the saran layer is thick enough to be an effective gas barrier but thin enough so that it is not adversely affected to any significant extent by irradiation used to cross-link layers which are cross-linkable and adjacent to the saran layer in a multi-layer film.

Still another object of the present invention is to improve the thermal stability of vinylidene chloride copolymers and to lessen their tendency to degrade while being extruded.

Among the plasticizers for thermoplastics which are listed in general articles and in literature references is glycerol or glycerin. In fact, in "Whittington's Dictionary of Plastics", Technomic Publishing Company, Inc., West Port, Conn., 1978, at page 152, glycerol is listed and the following statement about it is made: "Its uses in the plastics industry include the manufacture of alkyd resins (esters of glycerol and phthalic anhydride); the plasticization of cellophane; and the production of urethane polymers." Glycerin has also been used as a plasticizer for ethylene-vinyl alcohol compolymers and glycerol compounds such as glycerol mono-oleate have been used as heat stabilizing additives for vinylidene halide polymers as described in U.S. Pat. No. 4,274,999 issued on June 23, 1981 to Joseph W. Burley et al. Also in U.S. Pat. No. 4,115,334 which issued on Sept. 19, 1978 to C.W. Gerow an antistatic composition of a poly basic acid with a mono- or di- glyceride and a vinylidene chloride copolymer as an antistatic agent is disclosed. While a glycerol derivative has been used in the specific instances mentioned, a unique combination has been disclosed and thus, another object of the present invention is to provide an improved stabilizer-plasticizer combination for saran which employs glycerol alone.

SUMMARY OF THE INVENTION

It has been surprisingly discovered that the addition of glycerin provides several synergistic improvements to extrusion of vinylidene chloride copolymers and films produced thereby. The enhanced plasticization allows reduction of conventional plasticizers, the reduction of which improves oxygen barrier properties. Furthermore, the improved plasticization results in generation of less shear heat during processing which leads to less polymer degradation. This allows reduction or modification to the additives normally required to prevent heat-induced degradation which, in turn, can lead to further oxygen barrier improvements. In addition, all indications are that glycerin does not intimately mix with the vinylidene chloride copolymer but rather forms a second, separate phase. This further improves the oxygen barrier because only intimately mixed liquid additives seem to have a negative influence on oxygen barrier properties. The sum of these effects permits extrusion speeds and orientation rates to be maintained with improvements in oxygen barrier properties. In a similar manner, extrusion speed and orientation rates can be improved while the required oxygen barrier is provided by a thinner layer of vinylidene chloride copolymer.

Common methods for determining overall thermal stability for extrusion of vinylidene chloride copolymer blends with plasticizers and stabilizers involve working the blend between a pair of heated rollers or inside a heated mixing chamber. The time required for shear and temperature-induced degradation to produce a noticeably blackened polymer is a measure of effectiveness of a plasticizer/stabilizer combination in promoting heat stability. Commerically acceptable vinylidene chloride copolymer plasticizer/stabilizer combinations should show thermal stability times of 10-15 minutes in a mixing chamber such as a Brabender blender at 300° F.

It has unexpectedly found that the addition of approximately 1% by weight of glycerin to a blend of 4% by weight of EPON 828 and 2% Santicizer 141 will increase thermal stability from 15 minutes to 40+minutes. Furthermore, addition of 1% by weight of glycerin allows reduction of EPON 828 and Santicizer 141 to 1% by weight each and with the retention of 15 minute thermal stability. The Santicizer 141, in some instances, may even be eliminated. Oxygen barrier improved from 10-11 cc/m$^2$/24 hrs./atm. per mil of thickness to 5 to 6 cc/m$^2$/24 hrs/atm. per mil.

Thus, in one aspect, the present invention is an extrudable vinylidene chloride polymeric composition comprising 1.0% to 4.0% epichlorohydrin/bisphenol A epoxy resin 0 to 2.0% Santicizer-141 0.5% to 2.0% glycerin with the balance being one or more vinylidene chloride copolymers. Alternate expoxidized oils are linseed oil and expoxidized soybean oil which would be included in quantities up to 8% by weight.

In another aspect, the present invention is a multi-layer polymeric film comprising first and second surface layers with a vinylidene chloride copolymer layer disposed between said surface layers in which the vinylidene chloride copolymer layer includes glycerin as specified above.

In still another aspect, the present invention is a method of lowering the oxygen permeability and improving the thermal stability of a vinylidene chloride polymeric film plasticized with an epoxy resin comprising the steps of preparing a mixture comprising a vinylidene chloride copolymer and an epoxy resin and adding 0.5% to 1.5% glycerin; blending said mixture; and thereafter extruding a film from the mixture.

In a further aspect the foregoing blends may include 2-ethyl hexyl diphenyl phosphate and/or tetra-sodium pyrophosphate, magnesium oxide, epoxidized linseed oil, epoxidized soybean oil and other plasticizers. Still other aspects of the present invention include irradiation of a multi-layer film employing glycerin in the saran layer as specified above to cross-link the cross-linkable layers. Such cross-linkable layers may be surface layers or internal layers in addition to the saran layer and are preferably selected from the group consisting of ethylene-vinyl acetate copolymers, branched polyethylene, linear low density and very low density polyethylene, and blends thereof.

DEFINITIONS

As used herein, the following terms are understood to have the meaning set forth below:

"Polymer" means the product of polymerization and includes but is not limited to homopolymers, monopolymers, copolymers, interpolymers, terpolymers, block co-polymers, graft co-polymers, and addition co-polymers.

"Plasticizer" means a substance or material incorporated in a film or /film layer to increase the flexibility, workability, or extrudability of the film. These substances include both monomeric plasticizers and polymeric plsticizers and are generally those materials which function by reducing the normal intermolecular forces in a resin thus permitting the macromolecules to side over one another more freely. Other known plasticizers with epoxy groups attached such as, epichlorohydrin/bisphenol A epoxy, epoxidized linseed oil, and epoxidized soybean oil also function as plasticizers by reducing intermolecular forces and, as well, act as scavengers for HCL.

"Oriented" or "Orientation" refer to the process of stretching a hot plastic article followed by cooling to realign a molecular configuration thus improving mechanical properties. Stretching in one direction is called uniaxial orientation and in two directions is called biaxial orientation. In thermoplastic films which have been oriented there is an internal stress remaining in the plastic sheet which can be relieved by reheating the sheet to a temperature above that at which it was oriented. The material will then tend to shrink back to the original dimensions it had before it was stretch oriented.

"Vinylidene chloride polymer" or "vinylidene chloride copolymer" or "saran" means vinylidene chloride copolymerized with at least one other vinyl type monomer which includes vinyl chloride and methyl acrylate.

"Barrier" refers to a property in thermoplastic materials which indicates that the particular material has a very low permeability to gases. The principal barrier materials referred to herein are the vinylidene chloride copolymers designated as "saran" and hydrolyzed ethylene-vinyl acetate copolymers designated by the abbreviations: "EVAL" or "EVOH" or "HEVA".

DETAILED DESCRIPTION

In the aforementioned Gillio-Tos et al and Brax et al patents it was disclosed that a relatively high plasticizer-stabilizer content is required in the saran barrier layer in order that orientation and extrusion can be performed at commerical rates. The Gillio-Tos patent, for example, discloses that plasticizer in the range from 7 to 12% by weight is necessary for this purpose. In the Brax et al patent the lowest mentioned plasticizer-stabilizer content is 2% Epon resin combined with 2% Santicizer-141 in Example III. In the claims of Brax et al, the claimed range for inclusion of an epoxy resin is in claim 3 wherein a range from 2% to 10% by weight is set forth. By contrast, it has been discovered that the epoxy content may be lowered to 1% when used in combination with from 0.5% to 1.5% glycerin. This is quite unexpected as in present commerical film produced according to the Brax et al process, the optimum balance between extrudability, orientation, and barrier properties is obtained with about 4% epoxy content and about 2% Santicizer-141 content. The indication is that the plasticizer-stabilizer content may be lowered to as little as 25% of the previously required amount by the inclusion of glycerin.

As a control sample, a film was produced according to the Brax et al Patent, which patent is incorporated herein by reference and, unless otherwise noted herein, the film samples in the examples which follow are all three-layer films made by this process. The outer layers remain the same and the changes are made only in the composition of an internal or saran layer.

It is presently believed that the addition of glycerin has a synergistic effect upon plasticizers thereby remarkably increasing their permeability into the saran resin and that glycerin alone, in certain instances, can be a suitable and satisfactory plasticizer. One of the explanations of this is that glycerin is one of the few materials that has a solubility parameter higher than that of saran and its presence causes the plasticizers to be more effectively disbursed within the vinylidene chloride copolymer so that the barrier presented by vinylidene chloride is not degraded. Present indications are that other poly-hydroxy compounds such as ethylene glycol, propylene glycol, di-ethylene glycol, butane triol, mannitol and glycerol will produce beneficial results as does glycerin but not to the same degree of improvement.

Another benefit of the improved barrier characteristics resulting from the present invention is that when a thinner saran barrier layer is used there is less saran to expose to radiation if an irradiation cross-linked, multilayer film is desired. Saran will tend to darken and degrade at irradiation dosages above 4 megarads. Since the mass of saran exposed to irradiation is reduced, numerous cross-linked film combinations are available which were not heretofore feasible.

One significant result of the present invention is that the barrier properties and thermal stability of the saran films are simultaneously improved as demonstrated in Table A below which tabulates saran layer resin composition with the resulting thermal stability and oxygen transmission rate for three film samples.

TABLE A

|  | Reference Film | Film 1 | Film 2 |
|---|---|---|---|
| Saran resin (Wt. %) (Dow XU32019.00) | 94 | 97 | 96 |
| Epon 828 (Wt. %) | 4 | 2 | 2 |
| Santiczier 141 (Wt. %) | 2 | 1 | 1 |
| Glycerin (Wt. %) | 0 | 0 | 1 |
| Thermal Stability (mins) | 26 | 14 | 24 |
| Oxygen Transmission rate (cc/m$^2$/24 hrs/atm per mil) (ASTM D 3985-81) | 3.9 | 1.9 | 1.8 |

The Reference Film has an oxygen transmission rate of 3.9, and the resin blend of the saran layer has a thermal stability of 26 minutes which is the time within Braebender Plastigraph mixing chamber at 300° F. that it takes the blend to noticeably darken. Dropping the plasticizer/stabilizer content from a total of 6% to the 3% level of Film 1 drops the oxygen transmission to 1.9 but the thermal stability drops to 14 minutes. Now, by adding 1% glycerin to the Film 1 composition, as shown in the Film 2 column, the thermal stability dramatically increases by 10 minutes while the oxygen transmission rate drops even further to 1.8. Thus, a more thermally stable film with better barrier properties is the surprising result of adding glycerin.

In Table B below, the saran layer resin composition with various poly-hydroxy compounds is tabulated showing the thermal stability of each composition. In each sample the EPON 828 and Santicizer-141 levels are kept at 1% each and the saran proporation is constant at 97%.

TABLE B

| Ingredient (Wt. %) | Resin Blend Samples | | | | | | | |
|---|---|---|---|---|---|---|---|---|
|  | 1 | 2 | 3 | 4 | 5 | 6 | 7 | 8 |
| (1) Propylene glycol | 1.0 | | | | | | | |
| (2) Diethylene glycol | | 1.0 | | | | | | |
| (3) 1,4 Butene Diol | | | 1.0 | | | | | |
| (4) 1,2,4 Butene Triol | | | | 1.0 | | | | |
| (5) 1,3 Butene Diol | | | | | 1.0 | | | |
| (6) Mannitol | | | | | | 1.0 | | |
| (7) Glycerin | | | | | | | 1.0 | |
| (8) EPON 828 | 1.0 | 1.0 | 1.0 | 1.0 | 1.0 | 1.0 | 1.0 | 1.0 |
| (9) Santicizer-141 | 1.0 | 1.0 | 1.0 | 1.0 | 1.0 | 1.0 | 1.0 | 1.0 |
| (10) Saran (Dow 926) | 97 | 97 | 97 | 97 | 97 | 97 | 97 | 97 |
| Thermal Stability (Mins) | 8 | 10 | 10 | 14 | 8 | 8 | 16 | 6 |

Again, as Table B shows, thermal stability is greatly enhanced by the inclusion of about 1.0% glycerin, approximately by 10 minutes more than the sample 8 without any poly-hydroxy additive.

The effect of common mineral additives is set forth below in Table C showing a surprising improvement in thermal stability resulting from the combination of tetrasodium pyrophosphate and glycerin.

TABLE C

| Ingredient (Wt. %) | Resin Blend Sample Number | | | |
|---|---|---|---|---|
| | 1 | 2 | 3 | 4 |
| Magnesium Oxide | 1.0 | 1.0 | | |
| Tetrasodium Pysophosphate | | | 1.0 | 1.0 |
| Glycerin | 0 | 1.0 | 0 | 1.0 |
| Base Saran Resin | 99 | 98 | 97 | 98 |
| Thermal Stability (Min) | 10 | 18 | 10 | 42+ |

The base saran resin included 2% EPON 828, 1% Santicizer-141, and 97% Dow 926 resin. The combination of glycerin and tetrasodium pyrophosphate showed an extradordinary increase in thermal stability over the other combination. In particular, it should be noted that the thermal stability increased in both samples, namely 2 and 4, where glycerin was incorporated in the blend.

Table D below shows the effect of glycerin in combination with common saran stabilizers. The results are paired for three combinations, with and without glycerin.

TABLE D

| Ingredient (Wt. %) | Resin Blend Sample | | | | | |
|---|---|---|---|---|---|---|
| | 1a, | 1b | 2a, | 2b | 3a, | 3b |
| EPON 828 | 4 | 4 | 0 | 0 | 0 | 0 |
| Epoxidized Linseed Oil | 0 | 0 | 4 | 4 | 0 | 0 |
| Epoxidized Soybean Oil | 0 | 0 | 0 | 0 | 2 | 2 |
| Santicizer 141 | 2 | 2 | 2 | 2 | 1 | 1 |
| Glycerin | 0 | 1 | 0 | 1 | 0 | 1 |
| Saran (Dow 926) | 94 | 93 | 94 | 93 | | |
| Saran (Dow U65401.00) | | | | | 97 | 96 |
| Thermal Stability | 16 | 34+ | 12 | 16 | 14 | 20 |

The comparison shows that in each instance the thermal stability is increased by adding glycerin but the increase is very pronounced for sample 1b when the glycerin is included in combination with EPON 828.

The effect on thermal stability caused by varying the glycerin content while the base saran resin blend remains the same is shown in Table E below.

TABLE E

| Ingredient (Wt. %) | Resin Blend | | | | | |
|---|---|---|---|---|---|---|
| | 1 | 2 | 3 | 4 | 5 | 6 |
| GLycerin | 0 | 0.1 | 0.5 | 1.0 | 1.5 | 2.0 |
| Base Saran Resin Blend | 100 | 99.9 | 99.5 | 99.0 | 98.5 | 98.0 |
| Thermal Stability | 14 | 16 | 20 | 32 | 54+ | 64+ |

The base saran resin blend comprised 4% EPON 828, 2% Santicizer-141, 10% Dow 468 (Saran) and 84% Dow 926 (Saran). The continual improvement in thermal stability as glycerin is added is clearly demonstrated and the beneficial increase resulting from 0.5% to 1.5% concentrations is notable. At concentrations above 2% the surface of the resulting film tends to have an oily feel so that optimum concentration of glycerin for film purposes appears to be in range from about 0.5% to about 2.0%.

In Table F, a present commercial film made according to the Brax et al patent is listed as Film 1 and films intended for commercial use are listed as Films 2 through 5. Each of Films 2 through 5 contains 1% glycerin and Film 5, in addition, contains 1% tetrasodium pyrophosphate. The results show the improved barrier properties and thermal stability made possible by the addition of glycerin.

TABLE F

| Ingredient (Wt. %) | Film | | | | |
|---|---|---|---|---|---|
| | 1 | 2 | 3 | 4 | 5 |
| EPON 828 | 4 | 1 | 2 | 4 | 3 |
| Santicizer 141 | 2 | 1 | 1 | 0 | 0 |
| Glycerin | 0 | 1 | 1 | 1 | 1 |
| Tetrasodium Pryosphosphate | 0 | 0 | 0 | 0 | 1 |
| Saran (Dow 468) | 10 | 10 | 10 | 10 | 10 |
| Saran (Dow 926) | 86 | 87 | 86 | 85 | 85 |
| Thermal Stability (mins) | 14 | 14 | 16 | 28 | 30+ |
| Oxygen Transmission ($cc/m^2/24$ hrs/atm per mil) | 10.6 | 5.6 | 5.2 | 6.5 | 4.6 |

In each film containing glycerin the oxygen transmission is improved substantially over Film 1 which contains no glycerin, and remarkable improvement in the thermal stability of films having more than 1% EPON 828 is illustrated.

It is thus seen that the process and product of this invention produce superior results. While many details of the invention are specified above such details are by way of examples and are not limiting. The spirit and scope of the invention are limited only as set forth in the following claims.

I claim:

1. A method of lowering the oxygen permeability and improving the thermal stability of a plasticized vinylidene chloride polymeric film comprising the steps of:
   (a) preparing a mixture comprising a vinylidene chloride copolymer and epoxy resin;
   (b) adding glycerin to said mixture to comprise 0.5% to 1.5% thereof;
   (c) blending said mixture; and
   (d) extruding the blended resin to form a film 2. The method of claim 1 wherein the extrusion step is performed by extrusion coating the blended mixture onto a polymeric substrate film.

3. The method of claim 2 wherein the extrusion step is performed by coextruding the layer of blended mixture between two other polymeric layers.

4. The method of claim 3 wherein the vinylidene chloride polymer is a copolymer of vinyl chloride and vinylidene chloride having 5 to 40% by weight of vinyl chloride, the epoxy resin is epichlorohydrn/bisphenol A and including 1.0% to 4.0% 2-ethyl hexyl diphenyl phosphate.

5. The method of claim 3 including the step of irradiating the multi-layer film to a dosage level less than 4.0 MR.

6. The method of claim 4 including the step of adding tetrasodium pyrophosphate to comprise approximately 1% of the mixture.

7. The method of claim 3 wherein said vinylidene chloride copolymer mixture comprises more than one vinylidene chloride copolymer.

* * * * *